US012573217B2

(12) United States Patent
Yun et al.

(10) Patent No.: US 12,573,217 B2
(45) Date of Patent: Mar. 10, 2026

(54) SERVER, METHOD AND COMPUTER PROGRAM FOR GENERATING SPATIAL MODEL FROM PANORAMIC IMAGE

(71) Applicant: KT CORPORATION, Seongnam-si (KR)

(72) Inventors: Yeo Jin Yun, Seoul (KR); Gyu Cheol Lee, Seoul (KR); Jong Kyong Park, Seoul (KR); Yu Lee, Seoul (KR); Zu Cheul Lee, Yongin-si (KR); Chul Hee Lee, Seoul (KR)

(73) Assignee: KT CORPORATION, Gyeonggi-Do (KR)

( * ) Notice: Subject to any disclaimer, the term of this patent is extended or adjusted under 35 U.S.C. 154(b) by 263 days.

(21) Appl. No.: 18/250,082

(22) PCT Filed: Oct. 21, 2021

(86) PCT No.: PCT/KR2021/014776
§ 371 (c)(1),
(2) Date: Apr. 21, 2023

(87) PCT Pub. No.: WO2022/086200
PCT Pub. Date: Apr. 28, 2022

(65) Prior Publication Data
US 2023/0394766 A1     Dec. 7, 2023

(30) Foreign Application Priority Data

Oct. 22, 2020    (KR) ........................ 10-2020-0137665

(51) Int. Cl.
*G06V 20/64*      (2022.01)
*G06T 5/00*      (2024.01)
(Continued)

(52) U.S. Cl.
CPC ................ *G06V 20/64* (2022.01); *G06T 7/13* (2017.01); *G06T 7/60* (2013.01); *G06T 17/20* (2013.01); *G06V 10/24* (2022.01)

(58) Field of Classification Search
CPC .. G06T 17/20; G06T 7/13; G06T 7/60; G06T 2210/56; G06T 15/04; G06T 5/00;
(Continued)

(56) References Cited

U.S. PATENT DOCUMENTS 6,128,405 A * 10/2000 Fujii .................. G01B 11/2509
                                              356/602
9,208,607 B2 * 12/2015 Chu ........................ G06T 17/00
(Continued)

FOREIGN PATENT DOCUMENTS

CN      110009727 A * 7/2019 ............. G06T 17/00
CN      110322464 A * 10/2019 ......... G06K 9/00201
(Continued)

OTHER PUBLICATIONS

Poullis, Charalambos et al. Rapid Creation of Large-scale Photo-realistic Virtual Environments [Online]. Mar. 2008 [Retrieved on Feb. 27, 2025]. Retrieved from the Interest: <URL: https://ieeexplore.IEEE.org/document/4480767> (Year: 2008).*
(Continued)

*Primary Examiner* — King Y Poon
*Assistant Examiner* — Michelle Hau Ma
(74) *Attorney, Agent, or Firm* — HSML P.C.

(57) ABSTRACT

A server that creates a spatial model includes a derivation unit configured to derive boundary point information from a panoramic image of an indoor space; a point cloud creation unit configured to create a point cloud for the panoramic image; a division unit configured to divide the point cloud based on the boundary point information; a texture image creation unit configured to create a texture image by pro-
(Continued)

jecting the divided point cloud onto a plane corresponding to the divided point cloud; a mesh model creation unit configured to extract geometric information from the point cloud based on the boundary point information, and create a mesh model based on the extracted geometric information; and a spatial model creation unit configured to create the spatial model for the indoor space based on the texture image and the mesh model.

16 Claims, 7 Drawing Sheets

(51) Int. Cl.

| | | |
|---|---|---|
| *G06T 7/13* | (2017.01) | |
| *G06T 7/33* | (2017.01) | |
| *G06T 7/60* | (2017.01) | |
| *G06T 15/04* | (2011.01) | |
| *G06T 17/20* | (2006.01) | |
| *G06V 10/24* | (2022.01) | |
| *G06V 10/44* | (2022.01) | |

(58) Field of Classification Search
CPC ... G06T 7/33; G06T 2207/10028; G06T 7/70; G06T 2200/04; G06V 10/24; G06V 20/64; G06V 10/44
See application file for complete search history.

(56) References Cited

U.S. PATENT DOCUMENTS

| | | | | |
|---|---|---|---|---|
| 10,510,111 | B2 * | 12/2019 | Eraker | G06T 19/003 |
| 10,592,973 | B1 | 3/2020 | Eraker et al. | |
| 11,113,877 | B2 * | 9/2021 | Sun | G06V 20/653 |
| 2018/0089887 | A1 | 3/2018 | Chon | |
| 2019/0180714 | A1 | 6/2019 | Komeichi et al. | |
| 2020/0096641 | A1 | 3/2020 | Sasaki et al. | |
| 2020/0342674 | A1 * | 10/2020 | Chen | G06T 7/55 |

FOREIGN PATENT DOCUMENTS

| | | | | | | |
|---|---|---|---|---|---|---|
| CN | 111612920 | A | * | 9/2020 | | G06T 15/04 |
| JP | 2019168976 | A | * | 10/2019 | | |
| KR | 101192474 | B1 | | 10/2012 | | |
| KR | 101199475 | B1 | | 11/2012 | | |
| KR | 101375649 | B1 | * | 3/2014 | | G06T 15/04 |
| KR | 101574422 | B1 | | 12/2015 | | |
| KR | 101851303 | B1 | | 4/2018 | | |
| KR | 1020180067914 | A | | 6/2018 | | |
| KR | 1020190034199 | A | | 4/2019 | | |
| KR | 1020190057885 | A | | 5/2019 | | |
| KR | 1020190090663 | A | | 8/2019 | | |
| KR | 1020190117354 | A | | 10/2019 | | |
| WO | WO-2020013631 | A1 | * | 1/2020 | | G06T 3/0031 |

OTHER PUBLICATIONS

Autodesk. Tinkercad [Online]. Sep. 18, 2020 [Date retrieved from Wayback Machine; Retrieved on Feb. 27, 2025]. Retrieved from the Interest: <URL: https://www.tinkercad.com/> (Year: 2020).*

Agisoft LLC. Agisoft Metashape User Manual [Online]. 2019 [Retrieved on Feb. 27, 2025]. Retrieved from the Interest: <URL: https://www.agisoft.com/pdf/metashape-pro_1_5_en.pdf> (Year: 2019).*

Screenshot from YouTube video clip entitled "Reconstructing 3D Rooms with Metashape/Photoscan, Blender, MeshLab, Photoshop & Unreal 4 [tedious]" uploaded on Jun. 7, 2020 by user "nickl-lodeon" [Retrieved on Feb. 7, 2025]. Retrieved from the Internet: <URL: https://www.youtube.com/watch?v=NnSQS3VfZfI> (Year: 2020).*

Pasumansky, Alexey. 'Re: Using 360° panoramic Pictures in PhotoScan professional'. In Agisoft Metashape Forum [online]. Nov. 8, 2017, 04:42:04 PM [retrieved on Feb. 27, 2025]. Retrieved from the Internet: <URL: https://www.agisoft.com/forum/ index.php?topic=7968.0> (Year: 2017).*

MouseyFlash. 'Room scan—Getting rough uneven walls on mesh'. In Agisoft Metashape Forum [online]. In Agisoft Metashape Forum [online]. Feb. 26, 2016, 03: 12:38 PM [retrieved on Feeb. 27, 2025]. Retrieved from the Internet: <URL: https://www.agisoft.com/forum/ index.php?topic=5025.0> (Year: 2016).*

Anagnostopoulos, Ioannis et al. Detection of Walls, Floors, and Ceilings in Point Cloud Data [Online]. May 2016 [Retrieved on Jun. 26, 2025]. <URL: https://www.researchgate.net/publication/303515109_Detection_of_Walls_Floors_and_Ceilings_in_Point_Cloud_Data > (Year: 2016).*

Oesau et al. Indoor scene reconstruction using feature sensitive primitive extraction and graph-cut [Online]. Apr. 2014 [Retrieved on Oct. 16, 2025]. Retrieved from the Internet: <URL: https://www.sciencedirect.com/science/article/pii/S0924271614000410 > (Year: 2014).*

International Search Report issued in PCT/KR2021/014776, dated Jan. 20, 2022, 4 pages provided, with English translation.

Jae Won An et al., "Ceiling-Based Localization of Indoor Robots Using Ceiling-Looking 2D-LiDAR Rotation Module", Journal of Korea Multimedia Society vol. 22 No. 7, Jul. 31, 2019 pp. 780-789.

* cited by examiner $I_{(k,w)}$                    $X = \{x_w \| x_0, \ldots, x_n\}$

SERVER, METHOD AND COMPUTER PROGRAM FOR GENERATING SPATIAL MODEL FROM PANORAMIC IMAGE

TECHNICAL FIELD

The present disclosure relates to a server, method and computer program for generating a spatial model from a panoramic image.

BACKGROUND

In order to create a three-dimensional spatial model, a process of scanning a physical space using special equipment for scanning (e.g., radar equipment, three-dimensional depth camera, or the like) is required.

The three-dimensional spatial model is manually created based on the scanned images. In this case, it takes a long time to create the three-dimensional spatial model. An expert may be employed to create the three-dimensional spatial model, which requires a lot of money.

A conventional 360-degree image-based spatial analysis algorithm (e.g., HorizonNet) normalizes all images of a space (e.g., 1024*512) to increase the speed of spatial analysis, and uses the normalized images to create a point cloud model. The normalized images are images whose size is converted and thus cannot sufficiently reflect a resolution of the original images. Further, the point cloud model is created depending on the size of the normalized images. Thus, when the shape of the space becomes complicated or is elongated in one direction, the vertex density decreases, which causes a hole in the spatial model or increases the size of the hole.

DISCLOSURE OF THE INVENTION

Problems to be Solved by the Invention

The present disclosure is conceived to solve the above-described problems of the prior art and to create a texture image by filtering a point cloud for a panoramic image of an indoor space for each plane based on boundary point information derived from the panoramic image, create a mesh model with geometric information extracted from the point cloud based on the boundary point information, and create a spatial model for the indoor space based on the created texture image and mesh model.

The problems to be solved by the present disclosure are not limited to the above-described problems. There may be other problems to be solved by the present disclosure.

Means for Solving the Problems

According to an exemplary embodiment, a server that creates a spatial model may include a derivation unit configured to derive boundary point information from a panoramic image of an indoor space; a point cloud creation unit configured to create a point cloud for the panoramic image; a division unit configured to divide the point cloud based on the boundary point information; a texture image creation unit configured to create a texture image by projecting the divided point cloud onto a plane corresponding to the divided point cloud; a mesh model creation unit configured to extract geometric information from the point cloud based on the boundary point information, and create a mesh model based on the extracted geometric information; and a spatial model creation unit configured to create the spatial model for the indoor space based on the texture image and the mesh model.

According to another exemplary embodiment, a method for creating a spatial model by a server may include deriving boundary point information from a panoramic image of an indoor space; creating a point cloud for the panoramic image; dividing the point cloud based on the boundary point information; creating a texture image by projecting the divided point cloud onto a plane corresponding to the divided point cloud; extracting geometric information from the point cloud based on the boundary point information; creating a mesh model based on the extracted geometric information; and creating the spatial model for the indoor space based on the texture image and the mesh model.

According to another exemplary embodiment, A non-transitory computer-readable storage medium that stores a sequence of instructions for creating a spatial model, wherein the sequence of instructions, when executed by a computing device, causes a computing device to: derive boundary point information from a panoramic image of an indoor space, create a point cloud for the panoramic image, divide the point cloud based on the boundary point information, create a texture image by projecting the divided point cloud onto a plane corresponding to the divided point cloud, extract geometric information from the point cloud based on the boundary point information, create a mesh model based on the extracted geometric information, and create the spatial model for the indoor space based on the texture image and the mesh model.

This summary is provided by way of illustration only and should not be construed as limiting in any manner. Besides the above-described exemplary embodiments, there may be additional exemplary embodiments that become apparent by reference to the drawings and the detailed description that follows.

Effects of the Invention

According to any one of the above-described means for solving the problems, it is possible to create a texture image by filtering a point cloud for a panoramic image of an indoor space for each plane based on boundary point information derived from the panoramic image, create a mesh model with geometric information extracted from the point cloud based on the boundary point information, and create a spatial model for the indoor space based on the created texture image and mesh model.

Therefore, according to the present disclosure, images included in an original panoramic image are used as they are in the process of creating a texture image for each plane. Thus, it is possible to create a high-resolution texture image with improved expression accuracy without loss of resolution.

Further, according to the present disclosure, the number of vertices is minimized by filtering the geometric information corresponding to wall/ceiling/floor surfaces obtained from the point cloud, and meshing is performed based on the geometric information with the minimum number of vertices. Therefore, it is possible to create a lightweight mesh model and thus possible to create a lightweight spatial model while preserving details of the indoor space by applying the texture image to the created mesh model.

BEST MODE FOR CARRYING OUT THE INVENTION

Figure 1:
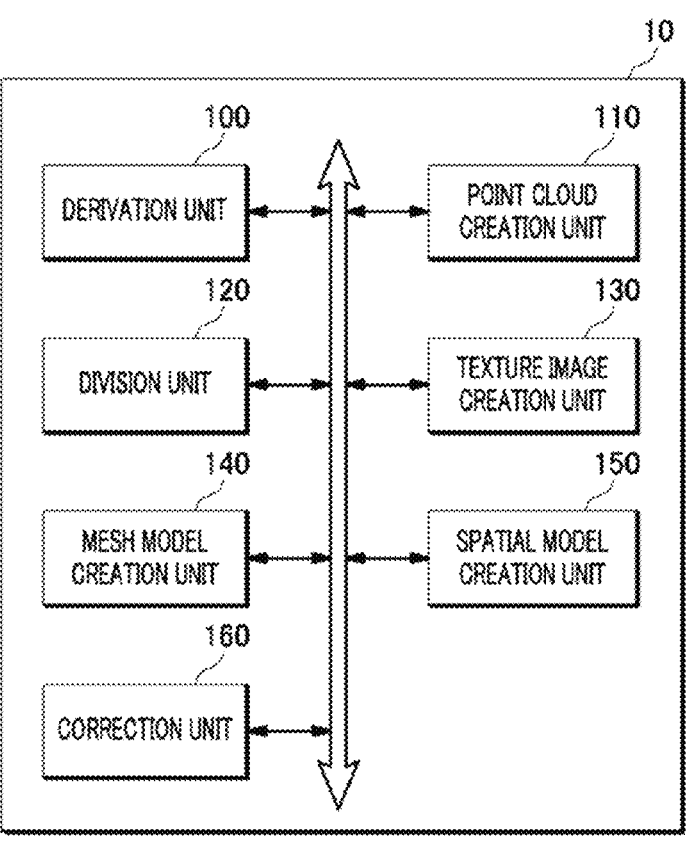
FIG. 1 is a block diagram illustrating a spatial model creation server in accordance with an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added. Throughout this document, when a member is said to be located "on" another member, this includes not only when the member is in contact with another member, but also when other member is present between the two members.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a device connected to the terminal or device. Likewise, a part of an operation or function described as being implemented or executed by a device may be so implemented or executed by a terminal or device connected to the device.

Hereinafter, embodiments of the present disclosure will be explained in detail with reference to the accompanying drawings.

FIG. 1 is a block diagram illustrating a spatial model creation server 10 in accordance with an embodiment of the present disclosure.

Referring to FIG. 1, the spatial model creation server 10 includes a derivation unit 100, a point cloud creation unit 110, a division unit 120, a texture image creation unit 130, a mesh model creation unit 140, a spatial model creation unit 150 and a correction unit 160. However, the spatial model creation server 10 illustrated in FIG. 1 is merely an embodiment of the present disclosure, and various modifications based on the components illustrated in FIG. 1 are possible.

Hereinafter, FIG. 1 will be described with reference to FIG. 2A to FIG. 4.

An image receiver (not shown) may receive a panoramic image of an indoor space from an image photographing device (e.g., 360-degree camera, or the like) photographing the indoor space. Herein, the panoramic image of the indoor space may be an original image whose size is not changed.

The derivation unit 100 may derive boundary line information and boundary point information from the panoramic image of the indoor space. For example, the derivation unit 100 may input the panoramic image of the indoor space to a boundary point detection algorithm to detect boundary line information (a boundary line between a wall and a ceiling, a boundary line between a wall and a floor) and boundary point information (a boundary point between walls) from the panoramic image.

The point cloud creation unit 110 may create a point cloud for the panoramic image.

The point cloud creation unit 110 may create a point cloud having points equal in number to a resolution of the panoramic image.

Figure 2A:
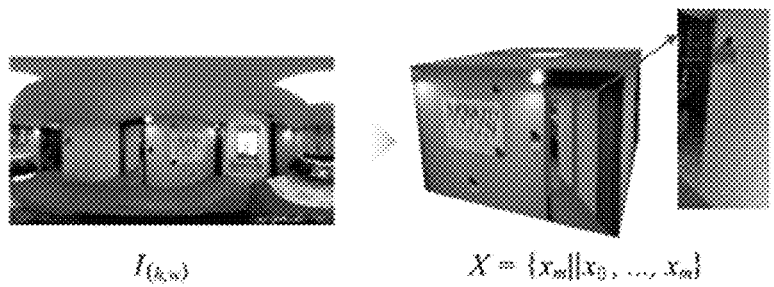
FIG. 2A is example depiction to explain a method for creating a texture image in accordance with an embodiment of the present disclosure.
Figure 2B:
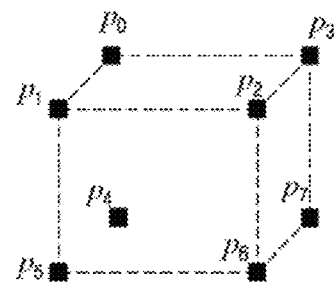
FIG. 2B is example depiction to explain a method for creating a texture image in accordance with an embodiment of the present disclosure.

Referring to FIG. 2A, the point cloud creation unit 110 may create a point cloud composed of points equal in number to the resolution of the panoramic image of the indoor space based on the derived boundary line information and boundary point information. Herein, coordinate information of the point cloud may be calculated by converting a spherical coordinate system to a Manhattan coordinate system. The coordinate information of the point cloud has three-dimensional coordinate information.

The division unit 120 may divide the point cloud based on the boundary point information.

The division unit 120 may select a reference boundary point for each plane from among a plurality of boundary points included in the boundary point information, and divide the point cloud for each plane based on the selected reference boundary point. For example, referring to FIG. 2B, a search unit (not shown) uses a nearest neighbor search algorithm to search the point cloud for vertices nearest to respective boundary points $P_0$, $P_1$, $P_2$, $P_3$, $P_4$, $P_5$, $P_6$ and $P_7$ included in the boundary point information from among a plurality of vertices constituting the point cloud. The division unit 120 may select the searched vertices as reference boundary points for respective planes, and divide the point cloud for each plane based on the selected reference boundary points. For example, the nearest neighbor search algorithm can be expressed mathematically as shown in Equation 1.

$$\min \sum_{i=0}^{n} \|P_{peak(i)} - X\|, \qquad \text{[Equation 1]}$$

$$\forall\, P_{peak} \neq X,\ P_{peak} = \{p_0, \dots, p_n\}$$

Herein, $P_{peak}$ represents a plurality of boundary points included in the boundary point information, and X represents a plurality of vertices constituting the point cloud.

The division unit 120 may divide a point cloud corresponding to a wall surface from the point cloud based on the number of vectors between the plurality of boundary points constituting a ceiling surface.

For example, the division unit 120 may detect four vertices constituting one plane from among N number of vertices (vertices included in the point cloud) searched for in a filtering process on the assumption that the wall surface is perpendicular to each of a floor surface and the ceiling surface, and obtain a point cloud located inside a boundary line formed by the four detected vertices.

After sequentially aligning boundary points corresponding to the ceiling surface, the division unit 120 may determine the number of wall surfaces based on the number of vectors connecting the boundary points corresponding to the ceiling surface, and extract a point cloud corresponding to the wall surface from the point cloud based on the determined number of wall surfaces.

Figure 2C:
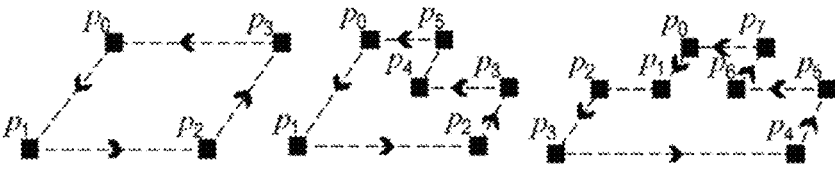
FIG. 2C is example depiction to explain a method for creating a texture image in accordance with an embodiment of the present disclosure.

Meanwhile, since the ceiling surface and the floor surface may have various shapes (e.g., a rectangular shape, a T-shape, an L-shape, or the like) depending on the shape of the space as shown in FIG. 2C, the number of boundary points may vary depending on the shape of the space.

Accordingly, the division unit 120 may divide, from the point cloud, a point cloud corresponding to the ceiling surface and the floor surface and determined as the inside of a polygonal region corresponding to the shape of the indoor space. That is, the division unit 120 may filter the point cloud determined as the inside of the polygonal region in the polygonal region (a region corresponding to the ceiling surface and the floor surface) set according to the plurality of boundary points as the point cloud corresponding to the ceiling surface and the floor surface.

In this case, the division unit 120 may distinguish a point cloud located inside the polygonal region and a point cloud located outside the polygonal region by using, for example, Equation 2.

For the convenience of calculation, the division unit 120 may use only two-dimensional coordinates of two axes constituting a plane in a three-dimensional coordinate system to determine the inside and the outside of the polygonal region. For example, when a base coordinate system constituting the space is used as a right-handed system, the direction of each vector is counter clockwise. Therefore, when an inside/outside determination for any vertex P(x, y) located in one plane is made, a direction vector connecting $P_0(x_0, y_0)$ and $P_1(x_1, y_1)$ satisfies Equation 2. Herein, the counter clockwise refers to the direction opposite to movement of a clock's hands.

$$(y-y_0)(x_1-x_0)-(x-x_0)(y_1-y_0) > 0 \qquad \text{[Equation 2]}$$

The texture image creation unit 130 may create a texture image by projecting the divided point cloud onto a plane corresponding to the divided point cloud.

For example, the texture image creation unit 130 may extract color information of each vertex included in the divided point cloud by using a third angle projection technique among multi-view projection techniques, and create a texture image based on the extracted color information. Herein, the third angle projection technique refers to a technique by which an object placed at a third angle is orthographically projected onto a projection plane.

Figure 2D:
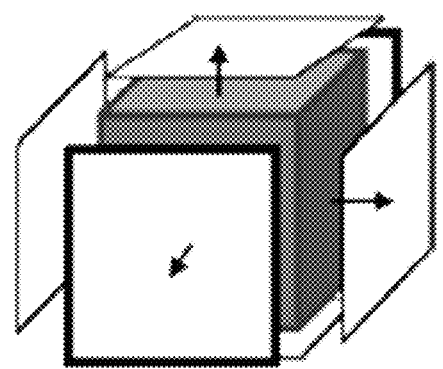
FIG. 2D is example depiction to explain a method for creating a texture image in accordance with an embodiment of the present disclosure.

For example, referring to FIG. 2D, the texture image creation unit 130 may project the divided point cloud onto the plane corresponding to the divided point cloud based on direction information (a direction from the inside to the outside of the indoor space) of a normal vector that determines a projection direction of each plane.

Figure 2E:
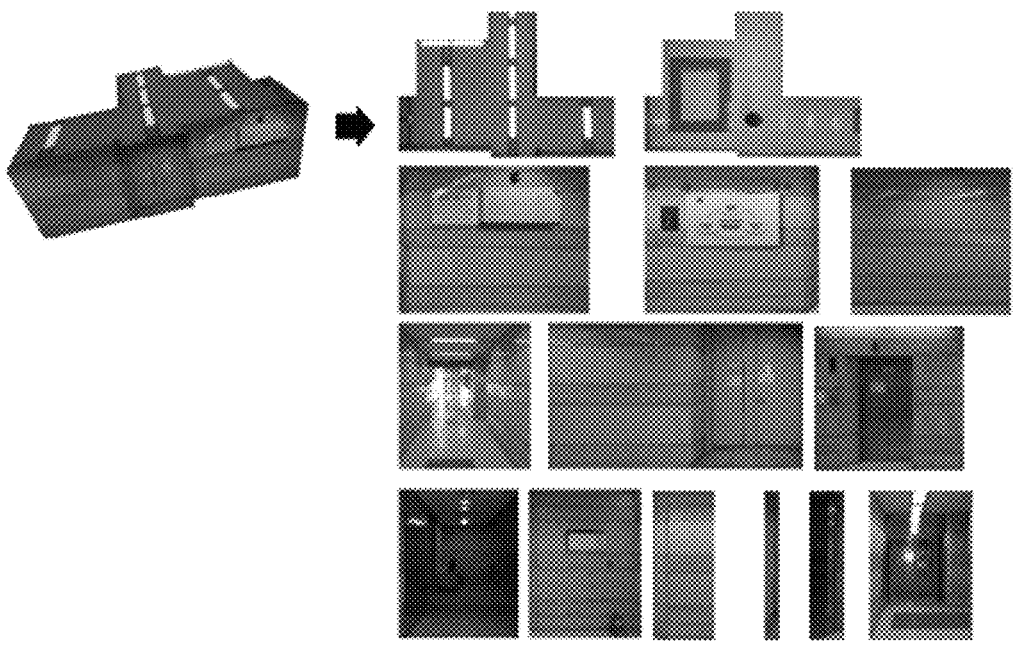
FIG. 2E is example depiction to explain a method for creating a texture image in accordance with an embodiment of the present disclosure.

For example, the texture image creation unit 130 may create a texture image corresponding to the wall surface by projecting point clouds corresponding to divided wall surfaces onto a plane corresponding to the wall surface as shown in FIG. 2E. Further, the texture image creation unit 130 may create a texture image corresponding to the ceiling surface by projecting point clouds corresponding to divided ceiling surfaces onto a plane corresponding to the ceiling surface. Furthermore, the texture image creation unit 130 may create a texture image corresponding to the floor surface by projecting point clouds corresponding to divided floor surfaces onto a plane corresponding to the floor surface.

When a hole is generated because vertices are not projected onto the created texture image, the texture image creation unit 130 may fill the hole in the texture image by using a hole filling algorithm. For example, when the divided point cloud is projected onto the plane corresponding to the divided point cloud, the hole filling algorithm performs hole filling based on information of adjacent pixels in four directions by using a fast marching method (FMM) to improve an operation speed. In this case, the hole filling algorithm can fill the hole based on resolution information of the original panoramic image, and, thus, it is possible to create a high-resolution texture image.

If the indoor space is a polyhedral space (e.g., a T-shape, an L-shape, or the like), the plane corresponding to the ceiling surface and the floor surface does not have a rectangular shape. Therefore, a region corresponding to the outside of a polygon on the plane corresponding to the ceiling surface and the floor surface based on a boundary edge of the indoor space is masked and excluded from projection to increase the operation speed. Even in a hole filling operation, the masked region may be excluded to increase the operation speed.

The texture image creation unit 130 may store a plurality of texture images created for each plane as well as coordinate information of boundary points included in a plane and corresponding to each texture image in a database. For example, the texture image creation unit 130 may store texture images created based on the number of planes constituting the indoor space with a predetermined image file extension (e.g., jpg, png, or the like). Further, the texture image creation unit 130 may store coordinate information of boundary points included in a plane corresponding to each texture image in json file format. In this case, the coordinate information of boundary points stored in the json file format may be information normalized to fit an imaginary space corresponding to the indoor space.

As described above, according to the present disclosure, images included in the original panoramic image are used as they are in the process of creating a texture image for each plane. Thus, it is possible to create a high-resolution texture image with improved expression accuracy without loss of resolution.

Meanwhile, the mesh model creation unit 140 may divide each plane into a ceiling surface, a floor surface, and a wall surface based on the boundary point information, and perform a nearest neighbor search algorithm in a three-dimensional space based on a plurality of boundary points included in the boundary point information to extract a vertex (geometric information corresponding to each of the ceiling/floor/wall surfaces) corresponding to a boundary point included in the boundary point information from among a plurality of vertices constituting the point cloud.

The mesh model creation unit 140 may extract geometric information from the point cloud based on the boundary point information, and create a mesh model based on the extracted geometric information.

The mesh model creation unit 140 may perform a meshing operation on a polygonal plane based on geometric information corresponding to the polygonal plane.

The mesh model creation unit 140 may perform a meshing operation on the wall surface based on geometric information corresponding to the wall surface and extracted from the point cloud to create a mesh model for the wall surface.

Figure 3A:
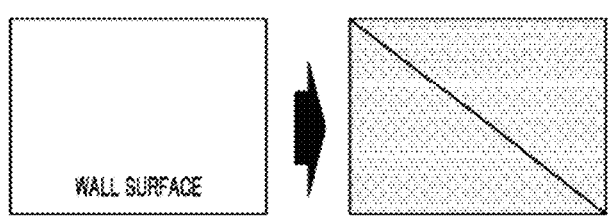
FIG. 3A is example depiction to explain a method for creating a mesh model in accordance with an embodiment of the present disclosure.

For example, referring to FIG. 3A, the mesh model creation unit 140 may extract, as the geometric information corresponding to the wall surface, four vertices constituting one plane while being perpendicular to the ceiling surface or the floor surface from among vertices (vertices included in the point cloud) corresponding to the boundary points included in the boundary point information. Also, the mesh model creation unit 140 may set a direction vector for the wall surface (a normal vector perpendicular to the plane in a direction from the inside to the outside of the indoor space), set the order of the four vertices in a counterclockwise direction (counter clockwise), and perform a meshing operation on the wall surface while performing triangulation using a general triangulation algorithm (e.g., Delaunay algorithm, Poisson algorithm, ball-pivoting algorithm, or the like).

Further, the mesh model creation unit 140 may repeatedly detect the wall surface by designating the number of vectors corresponding to a boundary edge generated based on boundary points corresponding to the ceiling surface as the number of wall surfaces required for space creation, and perform a meshing operation on the detected wall surfaces.

The mesh model creation unit 140 may perform a meshing operation on the ceiling surface and the floor surface based on geometric information corresponding to the ceiling surface and the floor surface and extracted from the point cloud, and create a mesh model for the ceiling surface and the floor surface.

The mesh model creation unit 140 may extract geometric information corresponding to the ceiling surface or the floor surface from vertices (vertices included in the point cloud) constituting one plane while being perpendicular to the wall surface. In this case, the geometric information corresponding to the ceiling surface and the floor surface may include geometric information of a polygon including four or more vertices depending on the shape of the space.

Figure 3B:
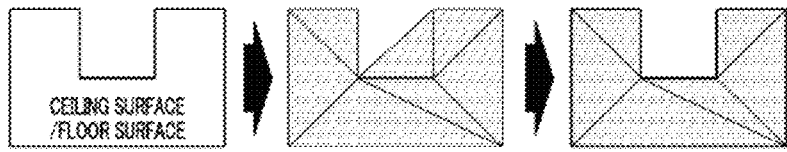
FIG. 3B is example depiction to explain a method for creating a mesh model in accordance with an embodiment of the present disclosure.
Figure 3C:
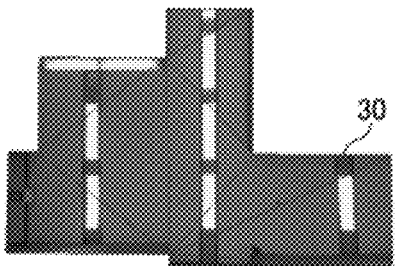
FIG. 3C is example depiction to explain a method for creating a mesh model in accordance with an embodiment of the present disclosure.

For example, referring to FIG. 3B, if a meshing operation is performed on a ceiling surface (or a floor surface) having a complex structure by using a general triangulation algorithm, a polygon-shaped concave region is filled. Therefore, a meshing operation can be performed on the ceiling surface (or the floor surface) by using a constrained triangulation algorithm that uses boundary edge information. Referring to FIG. 3C, the mesh model creation unit 140 may create a mesh model 30 for the ceiling surface by applying the constrained triangulation algorithm to the meshing operation on the ceiling surface.

The spatial model creation unit 150 may create a spatial model for the indoor space based on the texture image and the mesh model.

The spatial model creation unit 150 may create a spatial model by matching boundary point information corresponding to the texture image with boundary point information corresponding to the mesh model. For example, the spatial model creation unit 150 may create a spatial model by matching boundary point information corresponding to the texture image of the ceiling surface and the floor surface with boundary point information corresponding to the mesh model for the ceiling surface and the floor surface and matching boundary point information corresponding to the texture image of the wall surface with boundary point information corresponding to the mesh model for the wall surface.

The spatial model creation unit 150 may store information of the mesh model created for each plane (e.g., mesh material information, coordinate information corresponding to the mesh model, and the like) and information of a texture image associated with each mesh model in the same file format as previously determined so as to be compatible in a general three-dimensional (3D) model viewer environment.

Figure 3D:
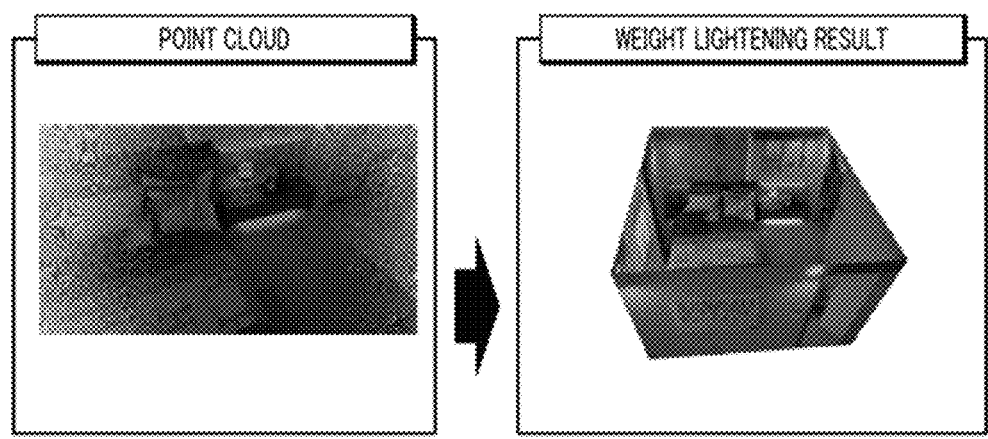
FIG. 3D is example depiction to explain a method for creating a mesh model in accordance with an embodiment of the present disclosure.

Referring to FIG. 3D, according to the present disclosure, the number of vertices is minimized by filtering the geometric information corresponding to the wall/ceiling/floor surfaces obtained from the point cloud, and meshing is performed based on the geometric information with the minimum number of vertices (e.g., 12 vertices). Therefore, it is possible to reduce the capacity of a mesh model. Also, according to the present disclosure, it is possible to create a lightweight spatial model based on texture images (e.g., 6 texture images) corresponding to the wall/ceiling/floor surfaces and the mesh model.

Meanwhile, in a spatial model created by the above-described method for creating a spatial model, but having a complex spatial structure, a region (occluded region) without information obtained from the panoramic image is not expressed. In order to solve this problem, according to the present disclosure, the occluded region may be expressed by using spatial models of a space respectively corresponding to a plurality of panoramic images obtained by photographing the indoor space at a plurality of positions.

Figure 4:
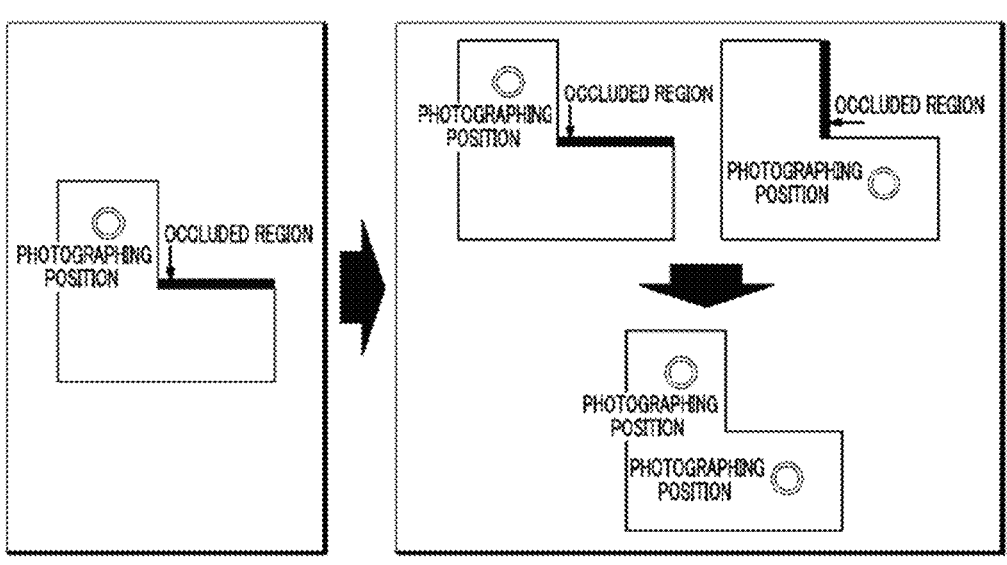
FIG. 4 is an example depiction to explain a method for correcting a plurality of spatial models in accordance with an embodiment of the present disclosure.

Referring to FIG. 4, the correction unit 160 may correct the occluded region by using the spatial models created corresponding to the plurality of panoramic images, respectively, obtained by photographing the same indoor space at different positions.

The correction unit 160 may select a reference model (e.g., a model created based on a panoramic image photographed at the center of the indoor space) from among the spatial models, and correct the occluded region by using texture images and geometric information constituting the other spatial models except the reference model.

The correction unit 160 may align, based on reference position information, the spatial models of the space respectively corresponding to the plurality of panoramic images obtained by photographing the indoor space at the plurality of positions. For example, the correction unit 160 may rotate at least one spatial model in consideration of the shape of the ceiling surface or the floor surface of the space, and set a center point calculated based on a bounding box as the reference position information. Then, the correction unit 160 may align the plurality of spatial models or perform a conversion such as size adjustment based on the set reference position information.

The correction unit 160 may calculate a displacement difference of boundary point information matched between the plurality of aligned spatial models, and correct the plurality of spatial models based on the calculated displacement difference.

For example, when it is assumed that a spatial model A is composed of N number of vertex sets P and a spatial model B created from panoramic images obtained by photographing the same space at different positions is composed of N number of vertex sets Q, a displacement difference and a normal difference for each of coordinates between a first spatial model and a second spatial model may be calculated as, for example, a chamfer distance as shown in Equation 3.

$$A = \{P \| p_0, p_1, p_2, \dots, p_n\}, \quad \text{[Equation 3]}$$

$$B = \{Q \| q_0, q_1, q_2, \dots, q_n\}$$

$$\mathcal{L}_{cham}(P, Q) = |P|^{-1} \sum_{(p,q) \in \Lambda_{P,Q}} \|p - q\|^2 + |Q|^{-1} \sum_{(q,p) \in \Lambda_{Q,P}} \|q - p\|^2$$

$$\mathcal{L}_{norm}(P, Q) = -|P|^{-1} \sum_{(p,q) \in \Lambda_{P,Q}} \|u_p \cdot v_q\|^2 - |Q|^{-1} \sum_{(q,p) \in \Lambda_{Q,P}} \|v_q \cdot u_p\|^2$$

Referring to Equation 3, the correction unit 160 may move a vertex to a position where $L_{cham}$ and $L_{norm}$ are minimized to match the spatial model A with the spatial model B. Thus, it is possible to derive geometric information for correcting the spatial models.

The correction unit 160 may correct the plurality of spatial models by comparing texture images matched between the plurality of aligned spatial models.

The correction unit 160 may correct the plurality of spatial models by using geometric information matched between the plurality of aligned spatial models.

If there is a missing texture image (e.g., a texture image corresponding to the wall surface) among texture images constituting the reference model in the plurality of spatial models, the correction unit 160 may obtain the missing texture image from the plurality of spatial models and correct the reference model based on the obtained texture image.

Meanwhile, it would be understood by a person with ordinary skill in the art that each of the derivation unit 100, the point cloud creation unit 110, the division unit 120, the texture image creation unit 130, the mesh model creation unit 140, the spatial model creation unit 150 and the correction unit 160 can be implemented separately or in combination with one another.

Figure 5:
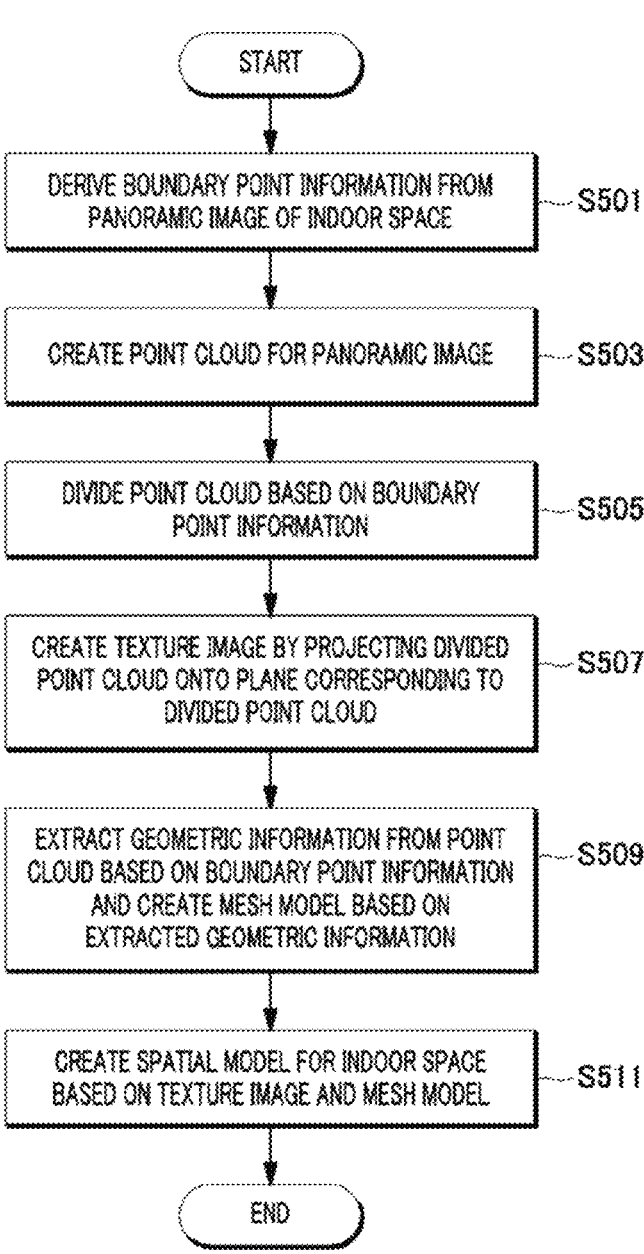
FIG. 5 is a flowchart illustrating a method for creating a spatial model in accordance with an embodiment of the present disclosure.

FIG. 5 is a flowchart illustrating a method for creating a spatial model in accordance with an embodiment of the present disclosure.

Referring to FIG. 5, in process S501, the spatial model creation server 10 may derive boundary point information from a panoramic image of an indoor space.

In process S503, the spatial model creation server 10 may create a point cloud for the panoramic image.

In process S505, the spatial model creation server 10 may divide the point cloud based on the boundary point information.

In process S507, the spatial model creation server 10 may create a texture image by projecting the divided point cloud onto a plane corresponding to the divided point cloud.

In process S509, the spatial model creation server 10 may extract geometric information from the point cloud based on the boundary point information and create a mesh model based on the extracted geometric information.

In process S511, the spatial model creation server 10 may create a spatial model for the indoor space based on the texture image and the mesh model.

In the descriptions above, processes S501 through S511 may be divided into additional processes or combined into fewer processes depending on an embodiment. In addition, some of the processes may be omitted and the sequence of the processes may be changed if necessary.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A server that creates a spatial model, comprising:

an input unit configured to input a panoramic image of an indoor space to a boundary point detection unit that derives, from the panoramic image of the indoor space, boundary point information that includes a plurality of boundary points between a plurality of planes for the indoor space;

a point cloud creation unit configured to create a point cloud for the panoramic image;

a division unit, implemented by hardware or a combination of hardware and software, the division unit being configured to:

set at least one polygonal region corresponding to the indoor space according to the plurality of boundary points based on the boundary point information, determine whether the created point cloud is located inside the polygonal region, and divide the point cloud by extracting the point cloud located inside the polygonal region based on the determination result;

a texture image creation unit configured to create a texture image by projecting the divided point cloud onto a plane corresponding to the divided point cloud;

a mesh model creation unit configured to:

extract geometric information from the point cloud based on the boundary point information, filter the extracted geometric information from the point cloud to minimize a number of vertices, and create a mesh model based on the extracted geometric information with the minimum number of vertices by:

performing a meshing operation on a wall surface based on geometric information corresponding to the wall surface extracted from the point cloud, and performing a meshing operation on a ceiling surface and a floor surface based on geometric information corresponding to the ceiling surface and the floor surface extracted from the point cloud; and a spatial model creation unit configured to create the spatial model for the indoor space based on the texture image and the mesh model.

2. The server of claim 1, wherein the point cloud creation unit is further configured to create the point cloud having points equal in number to a resolution of the panoramic image.

3. The server of claim 1, wherein the division unit is further configured to:

select a reference boundary point for each plane from among the plurality of boundary points included in the boundary point information, and divide the point cloud for each plane based on the selected reference boundary point.

4. The server of claim 3, wherein the division unit is further configured to divide a point cloud corresponding to a wall surface from the point cloud based on the number of vectors between boundary points from the plurality of boundary points corresponding to a ceiling surface.

5. The server of claim 4, wherein the division unit is further configured to divide, from the point cloud, a point cloud corresponding to a ceiling surface and a floor surface determined as an inside of the polygonal region corresponding to a shape of the indoor space.

6. The server of claim 1, wherein the spatial model creation unit is further configured to create the spatial model by matching information from the boundary point information corresponding to the texture image with information from the boundary point information corresponding to the mesh model.

7. The server of claim 1, further comprising:

a correction unit, implemented by hardware or a combination of hardware and software, the correction unit being configured to:

align, based on reference position information, a plurality of spatial models respectively corresponding to a plurality of panoramic images obtained by photographing the indoor space at a plurality of positions, calculate a displacement difference of boundary point information matched between the plurality of aligned spatial models, and correct the plurality of spatial models based on the calculated displacement difference.

8. The server of claim 7, wherein, if there is a missing texture image among texture images constituting a reference model in the plurality of spatial models, the correction unit is further configured to obtain the missing texture image from the plurality of spatial models and correct the reference model based on the obtained texture image.

9. A method for creating a spatial model by a server, the method comprising:

deriving boundary point information including a plurality of boundary points between a plurality of planes for an indoor space from a panoramic image of the indoor space;

creating a point cloud for the panoramic image;

setting at least one polygonal region corresponding to the indoor space according to the plurality of boundary points based on the boundary point information;

determine whether the created point cloud is located inside the polygonal region;

dividing the point cloud by extracting the point cloud located inside the polygonal region based on the determination result;

creating a texture image by projecting the divided point cloud onto a plane corresponding to the divided point cloud;

extracting geometric information from the point cloud based on the boundary point information;

filtering the extracted geometric information from the point cloud to minimize a number of vertices;

creating a mesh model based on the extracted geometric information with the minimum number of vertices by:

performing a meshing operation on a wall surface based on geometric information corresponding to the wall surface extracted from the point cloud, and performing a meshing operation on a ceiling surface and a floor surface based on geometric information corresponding to the ceiling surface and the floor surface extracted from the point cloud; and creating the spatial model for the indoor space based on the texture image and the mesh model.

10. The method of claim 9, wherein the creating a point cloud includes creating the point cloud having points equal in number to a resolution of the panoramic image.

11. The method of claim 9, wherein the dividing the point cloud includes:

selecting a reference boundary point for each plane from among the plurality of boundary points included in the boundary point information; and dividing the point cloud for each plane based on the reference boundary point.

12. The method of claim 11, wherein the dividing the point cloud includes:

dividing a point cloud corresponding to a wall surface from the point cloud based on the number of vectors between boundary points from the plurality of boundary points corresponding to a ceiling surface.

13. The method of claim 11, wherein the dividing the point cloud includes:

dividing, from the point cloud, a point cloud corresponding to a ceiling surface and a floor surface determined as an inside of the polygonal region corresponding to a shape of the indoor space.

14. The method of claim 9, wherein the creating the spatial model includes:

creating the spatial model by matching information from the boundary point information corresponding to the texture image with information from the boundary point information corresponding to the mesh model.

15. The method of claim 9, further comprising:

aligning, based on reference position information, a plurality of spatial models respectively corresponding to a plurality of panoramic images obtained by photographing the indoor space at a plurality of positions;

calculating a displacement difference of boundary point information matched between the plurality of aligned spatial models; and correcting the plurality of spatial models based on the calculated displacement difference.

16. The method of claim 9, wherein the method is performed by a computing device executing a sequence of instructions for creating a spatial model.

\* \* \* \* \*